H. D. MURRAY.
INLET VALVE FOR COMPRESSORS.
APPLICATION FILED MAR. 29, 1911.
1,029,025.
Patented June 11, 1912.
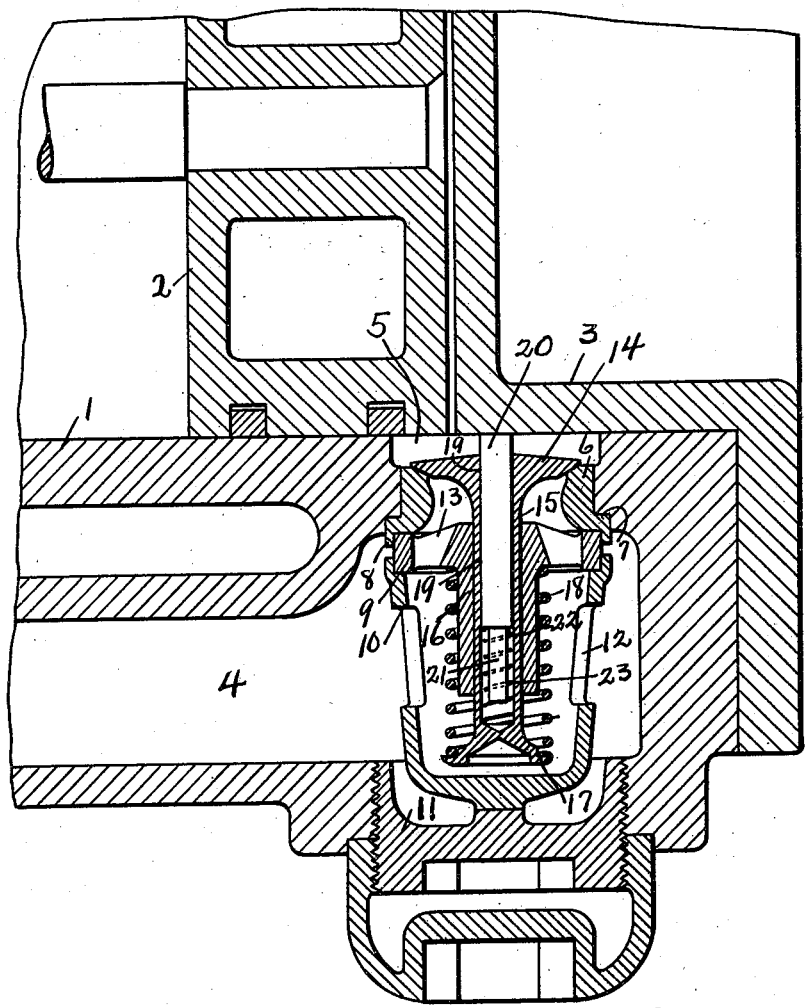
Witnesses
B. M. Hartman
Vinnie C. Hess
Inventor
Harry D. Murray
by H. Z. Lord
Attorney

UNITED STATES PATENT OFFICE.

HARRY D. MURRAY, OF GROVE CITY, PENNSYLVANIA, ASSIGNOR TO THE BESSEMER GAS ENGINE COMPANY, OF GROVE CITY, PENNSYLVANIA, A CORPORATION OF PENNSYLVANIA.

INLET-VALVE FOR COMPRESSORS.

1,029,025.        Specification of Letters Patent.      Patented June 11, 1912.

Application filed March 29, 1911. Serial No. 617,728.

*To all whom it may concern:*

Be it known that I, HARRY D. MURRAY, a citizen of the United States, residing at Grove City, in the county of Mercer and State of Pennsylvania, have invented new and useful Improvements in Inlet-Valves for Compressors, of which the following is a specification.

This invention relates to inlet valves for compressors, and consists in certain improvements in the construction thereof as will be hereinafter fully described and pointed out in the claim.

The principal object of the invention is to provide inlet valves for compressors with means for preventing the carrying of the valve disk into the compressor cylinder when the disk is broken from its stem.

The invention is illustrated in the accompanying drawings wherein a central section of an inlet valve with the adjacent portions of a compressor cylinder are shown.

1 marks the compressor cylinder, 2 the piston therein and 3 the cylinder head. The inlet passage 4 is arranged in the cylinder and is connected with the valve passage 5 at the end of the cylinder, the valve passage entering the cylinder just inside the cylinder head. These parts are of ordinary construction.

The valve seat 6 has an annular shoulder 7 which rests on the walls of the passage 5. The seat has the annular flange 8 in which rests the ring 9 of the guide spider 13. A follower 10 rests on the ring 9. A nut 11 is screwed into the walls of the passage 4 against the follower 10, thus securing the different parts in place. The follower is provided with the openings 12 through which the air passes to the valve by way of the spider 13.

A valve disk 14 operates on the seat 6. It has a stem 15 which is carried in the guide 16 extending from the spider 13. The stem 15 has the shoulder 17 at its outer end and the spring 18 is tensioned between the shoulder 17 and the spider 13 tending to hold the valve disk 14 to its seat.

An opening 19 extends in an axial direction from the face of the valve disk 14 and nearly through the stem 15. A pin 20 is arranged in this opening. It has a reduced end 21 forming a shoulder 22 and a spring 23 is arranged between the shoulder 22 and the end of the opening 19. The pin 20 rests on the cylinder head 3 and is normally held in this position by the spring 23. It will be noted that the opening 19 reduces the weight of the valve very materially. This is in keeping with the best valve design on account of making the valve action more flexible or quicker in action.

Should the valve disk 14 break from its stem, it cannot be carried into the cylinder by reason of the pin 20. The hollow stem, therefore, is of advantage because it is stronger than a solid stem having the same cross section of material, and in connection with the safety pin which is normally stationary, is perfectly safe, and at the same time, the valve is much lighter than where the stem of solid cross section is used.

What I claim as new is:

In an inlet valve for compressors, the combination of a cylinder having an inlet passage; a cylinder head extending over a part of the passage; a valve disk operating in the inlet passage; a stem extending from the valve disk, said disk and stem having an opening extending in an axial direction from the face of the valve; a pin arranged in the opening and resting on the cylinder head; a spring arranged in the opening and arranged against the pin; a guide in which the valve stem operates; a shoulder on the valve stem; and a spring arranged between the shoulder and the guide for exerting pressure on the valve.

In testimony whereof I have hereunto set my hand in the presence of two subscribing witnesses.

HARRY D. MURRAY.

Witnesses:
     WM J. SLOAN,
     E. J. FITHIAN.

---

Copies of this patent may be obtained for five cents each, by addressing the "Commissioner of Patents, Washington, D. C."